United States Patent [19]
Lee

[11] Patent Number: 5,774,035
[45] Date of Patent: Jun. 30, 1998

[54] CURRENT TRANSFORMER FOR LOAD SWITCH

[75] Inventor: Seok Won Lee, Chungcheongbuk-do, Rep. of Korea

[73] Assignee: LG Industrial Systems Co., Ltd., Seoul, Rep. of Korea

[21] Appl. No.: 883,430

[22] Filed: Jun. 26, 1997

[30] Foreign Application Priority Data

Jun. 27, 1996 [KR] Rep. of Korea .................. 1996-17930

[51] Int. Cl.[6] ............................. H01F 38/20; H01F 27/28; H02G 15/28; H01B 17/26
[52] U.S. Cl. ......................... 336/173; 336/175; 336/173; 336/229; 174/11 BH; 174/12 BH; 174/152 R; 174/152 E
[58] Field of Search ................................. 336/90, 92, 96, 336/65, 105, 174, 175, 173, 229; 174/11 BH, 12 BH, 14 BH, 152 R, 152 E, 140 R, 142

[56] References Cited

U.S. PATENT DOCUMENTS

| | | |
|---|---|---|
| 3,136,842 | 6/1964 | Perkins et al. ...................... 174/152 R |
| 3,222,625 | 12/1965 | Ledoco ..................................... 336/174 |
| 4,436,950 | 3/1984 | Gaffal et al. ......................... 174/152 R |
| 4,670,625 | 6/1987 | Wood et al. ............................. 174/142 |

*Primary Examiner*—Michael L. Gellner
*Assistant Examiner*—Anh Mai
*Attorney, Agent, or Firm*—Birch, Stewart, Kolasch & Birch, LLP

[57] ABSTRACT

A current transformer for a load switch which has an interior construction tightly engaged with a main bushing therein, allows a voltage in a cable to be detected by forming an engaging hole, communicated with a conductive socket of the main bushing, on a portion of an outer circumferential surface thereof, and which has a current transformer coating casing, made of a rubber material, for thereby diminishing a thickness of the current transformer, includes a core in a ring shape, a coil winding the core, a rubber coating member for tightly covering the core and the coil therein, and coil terminals connected to both ends of the coil. The rubber coating member includes a lower coating part for tightly covering a base unit of the main bushing, and an upper coating part for tightly covering a jaw unit of the main bushing, as well as the coil and the core.

4 Claims, 5 Drawing Sheets

CURRENT TRANSFORMER FOR LOAD SWITCH

BACKGROUND OF THE INVENTION

1. Field of the Invention

The present invention relates to a current transformer coated with a rubber insulating material for a load switch, and in particular to an improved current transformer communicating with a cable via a cable connection bushing, for measuring a current in a cable of a load switch capable of allowing a voltage of the cable to be detected and of reducing the thickness of a casing of the current transformer by forming an engaging hole, communicated with a conductive socket of the cable connection bushing, on a portion of an outer circumferential surface thereof.

2. Description of the Conventional Art

Generally, a conventional current transformer, as shown in FIG. 1, conducts a voltage being induced in a coil 3, which winds around a ring shaped core 1, through terminals 4. The voltage conducted is proportionate to a current flowing in a current detection object 2 penetrating the ring shaped core 1, and thereby is used for measuring a current value corresponding to an induction voltage value.

A current transformer according to the present invention is suitably applied to a load switch.

As shown in FIGS. 2 and 5, the load switch is installed, connecting with an alternating current high voltage cable over 10 kilovolts, and serves to connect with, or cut off, a voltage of the cable. The load switch is an electric power distributing apparatus which may be installed indoors as well as outdoors. As shown in FIGS. 2 and 3, in the case of a cable 70, the alternating current high voltage cable connects with a three-phase alternating current cable, each set of three phase-based cables forming a source side cable and a load side cable thereof.

As shown in FIG. 4A, the cable 70 is connected to the load switch by cable connection bushings 85.

A body unit 100, in FIG. 4A, includes a switching mechanism as a main structural member which serves to connect with, or cut off, circuits in the cable connection bushings, that is, the cables.

The present invention relates to the current transformer engaged to the cable connection bushing 85 connected with the source side cable and the load side cable of the set of three phase-based cables, thereby being capable of measuring the value of an electric current in the cable.

A current transformer protection casing closely adherent to an outer circumferential surface of the conventional switch is formed by an epoxy molding or is made out of coal tar.

However, when the above-described conventional current transformer protection casing, made of materials such as an epoxy resin or coal tar, is formed under a certain thickness, breakage of a portion of the current transformer protection casing often occurs, thereby causing a problem in that the current transformer protection casing should be formed greater than a certain thickness to secure adequate protection.

SUMMARY OF THE INVENTION

Accordingly, it is an object of the present invention to provide a current transformer for a load switch which is closely connected to a cable connection bushing which connects therein and forms an engaging hole on a portion of an outer circumferential surface thereof, communicated to a conductive socket of the cable connection bushing, for thereby allowing a voltage of the cable connected with the cable connection bushing to be detected.

And it is another object of the present invention to provide a current transformer for a load switch in which a current transformer protection casing is made of a rubber material, for thereby making possible the diminishing of the size of the current transformer.

To achieve the above objects, there is provided a bushing which comprises a base unit having a conductive socket for detecting a cable voltage therein, a jaw unit having a shorter outer diameter than the base unit, and a cone shaped unit, extended from the jaw unit, having a shorter outer diameter than the jaw unit. The current transformer comprises a ring shaped core, a coil winding the core, a rubber coating member by which the coil and the core are tightly covered therein, and coil terminals connected to each end of the coil. The rubber coating member comprises a lower coating part for covering the base unit of the bushing and an upper coating part for covering the jaw unit, as well as the coil and the core.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

With reference to the accompanying drawings, an embodiment of a current transformer of a load switch according to the present invention will now be described.

Figure 1:
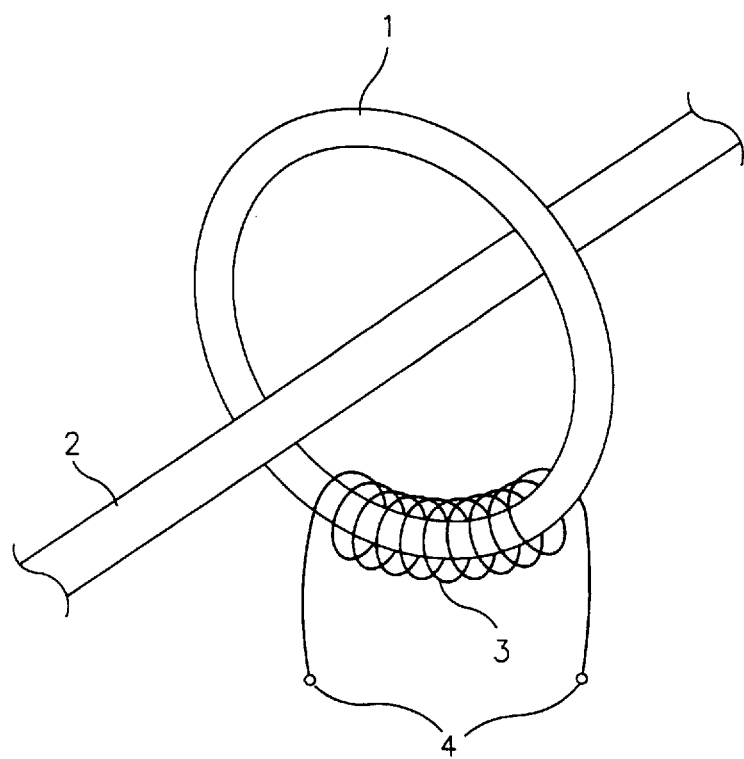
FIG. 1 is a diagram illustrating a conventional current transformer.
Figure 3:
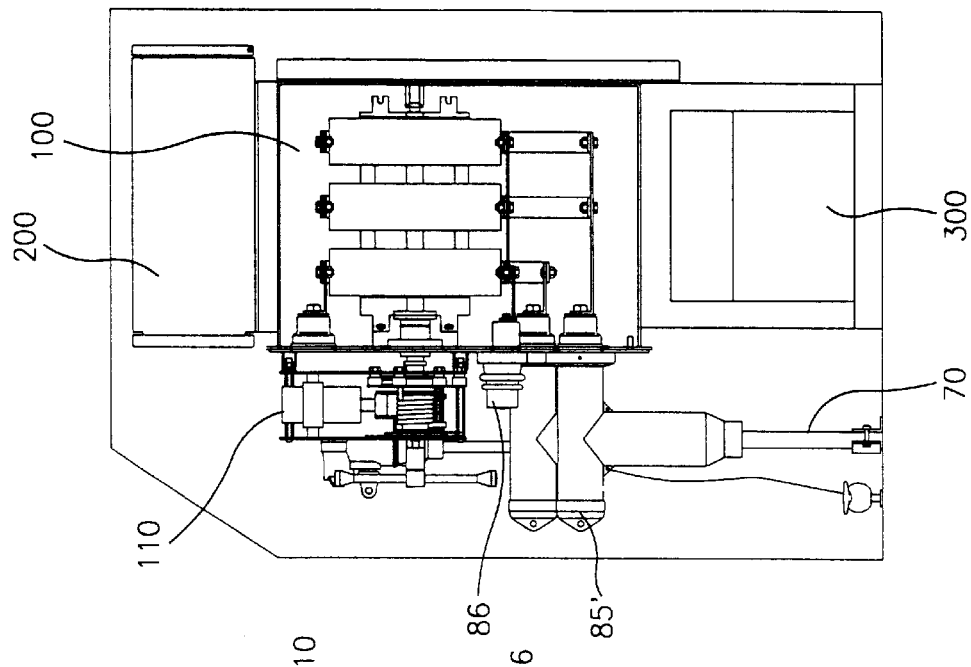
FIG. 3 is a side view illustrating the switch according to the embodiment of the present invention.
Figure 2:
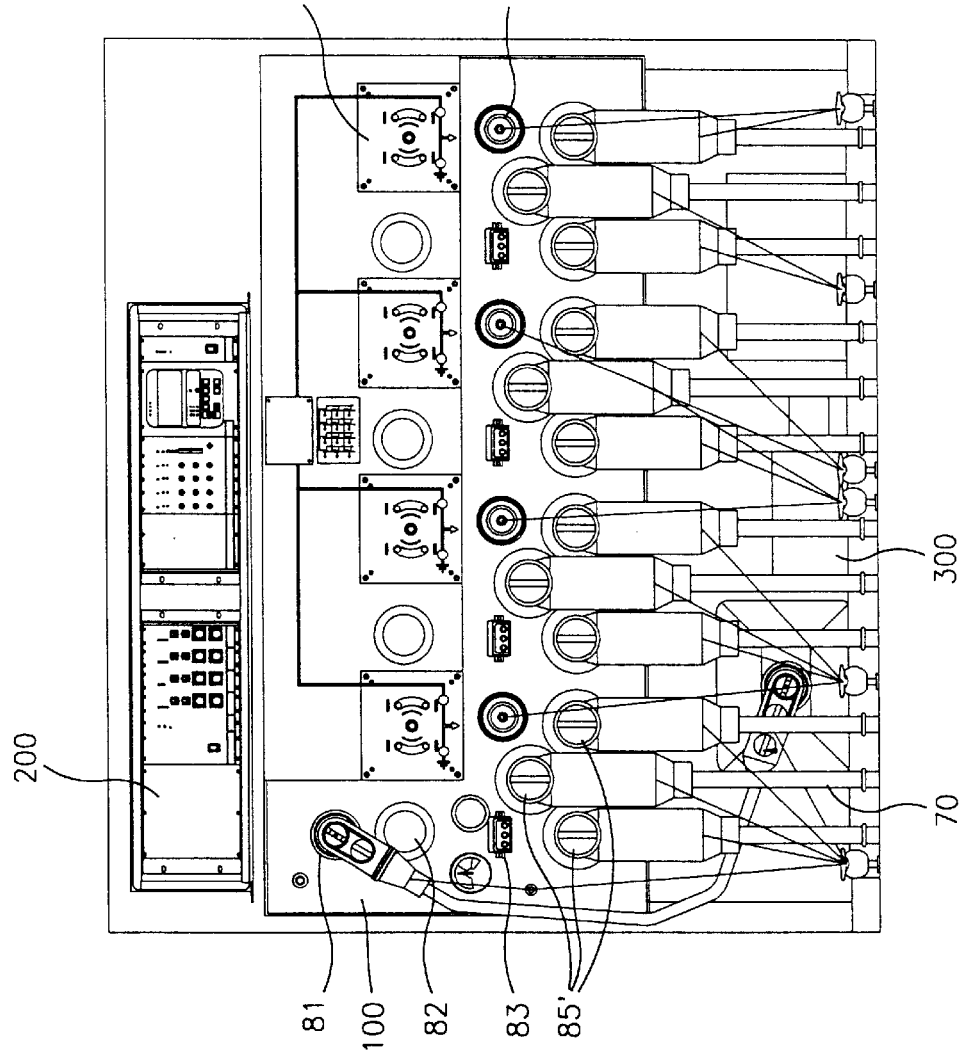
FIG. 2 is a front view illustrating a switch according to an embodiment of the present invention.

As shown in FIGS. 2 and 3, the switch, in which the current transformer of the load switch according to the present invention is embodied, includes three main units which are a body unit 100 positioned in the middle thereof, a controller unit 200 in the upper part thereof, and a controller power source supply unit 300, such as a storage battery, in the lower part thereof.

The construction of the body unit 100, the controller unit 200, and the controller power supply unit 300 will now be described in detail.

An alternating current power source bushing 81, connected to an alternating current power source, is installed in the upper part of the front side of the body unit 100 and, beneath the alternating current power source bushing 81, four automatic switch operating apparatuses 110 are positioned at regular intervals.

Each of the automatic switch operating apparatuses 110 serves to operate a switching mechanism (not illustrated) of the body unit 100 in accordance with the control of the controller unit 200.

And, in between each of the automatic switch operating apparatuses 110, a viewing window 82 is positioned for visibly showing an operating condition of the switching mechanism.

An input and output unit respectively installed beneath each automatic switching operating apparatus 110 will now be described in detail.

Figure 4A:
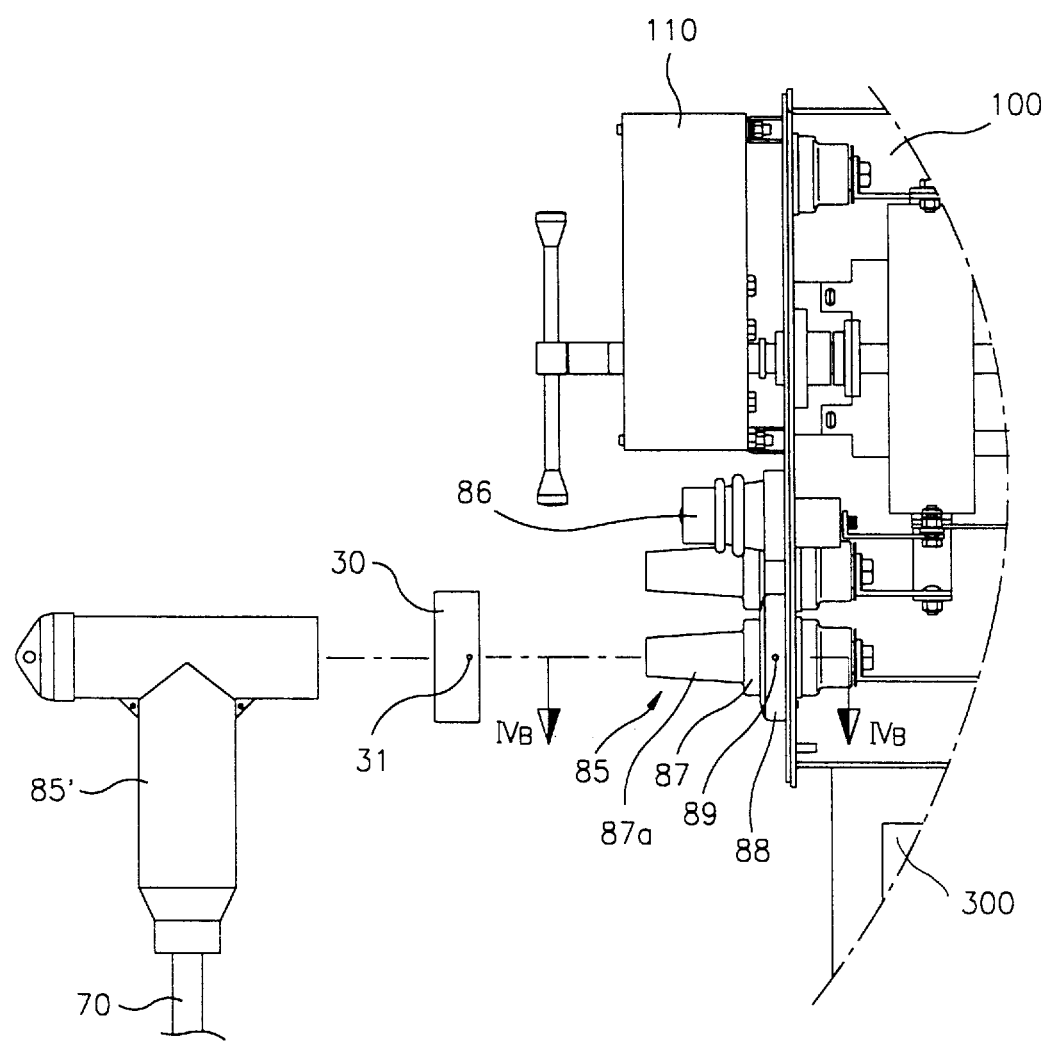
FIG. 4A is a diagram illustrating a current transformer being connected to a connecting member and a cable connection bushing.

Each input and output unit includes three cable connection bushings 85 (as shown in FIG. 4A, called a main bushing as a whole) respectively engaged by one end of a connection member 85' of which the other end is connected to the cable 70, and a single grounded bushing 86.

In between each grounded bushing 86, an indicator 83 is installed.

As shown in FIG. 4A, each main bushing 85 includes a base unit 88 having a cable voltage connection conductive socket 89 therein, a jaw unit 87 having a smaller outer diameter than the base unit 88, and a cone shaped unit 87a, for being connected to a cable, having a smaller outer diameter than the jaw unit 87.

Figure 4B:
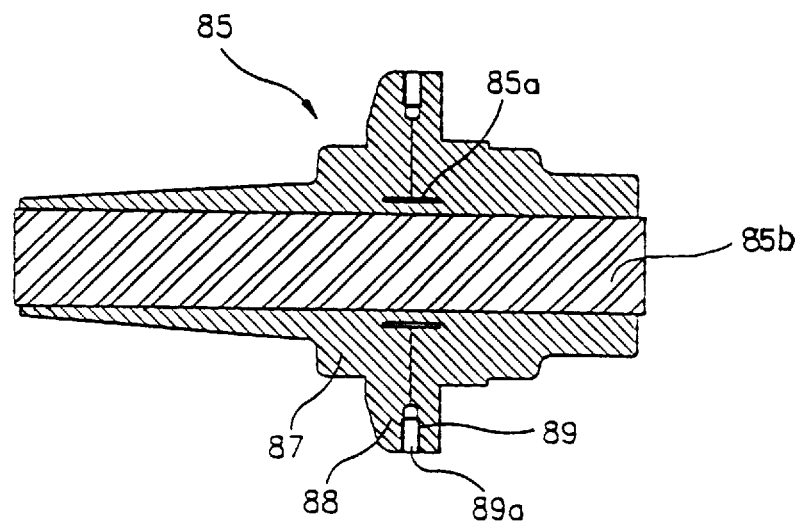
FIG. 4B is a cross-sectional view taken along the line IVb—IVb in FIG. 4A.

As shown in FIG. 4B, in an internal structure of each main bushing 85, a conductive plate 85a in a columnar shape, which induces a voltage so that each phase-based voltage condition can be observed when a high voltage from each phase-based cable 70 is applied to the main bushing 85a, and a plurality of conductive sockets 89, electrically connected to the conductive plate 85a, are molded in the jaw unit 87 of the main bushing 85, spaced at regular intervals, along the columnar line.

Figure 6:
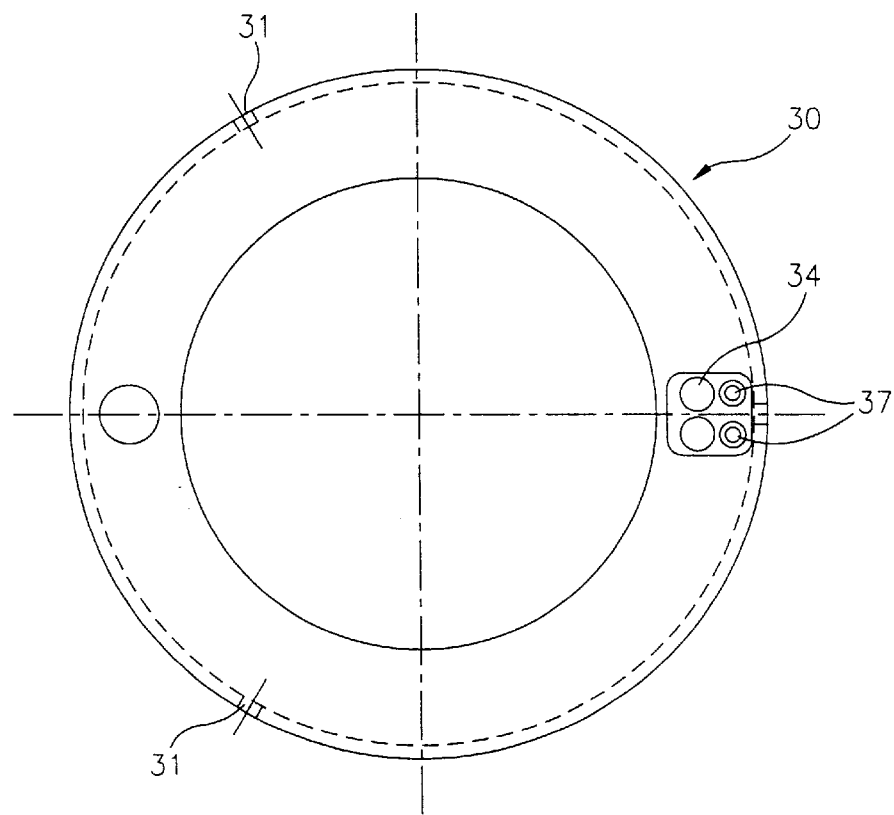
FIG. 6 is a plan view illustrating the current transformer of the load switch according to the present invention.
Figure 7:
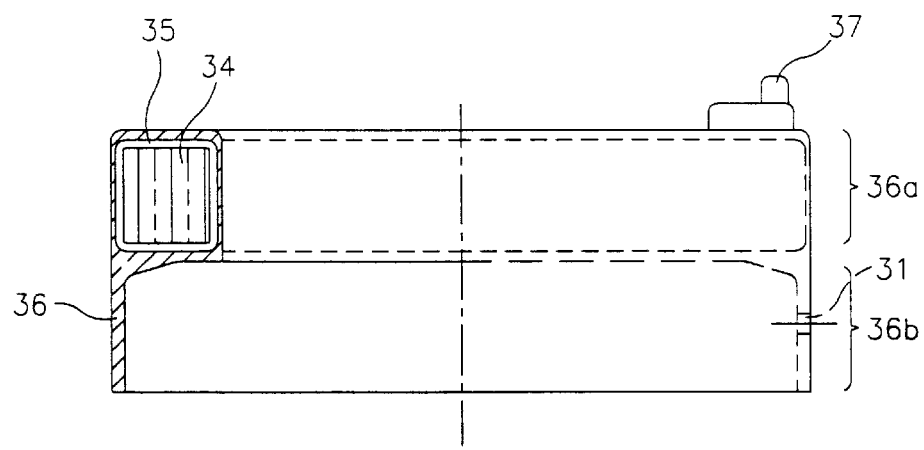
FIG. 7 is a cross-sectional view of the current transformer of the load switch according to the present invention.

As shown in FIGS. 6 and 7, a current transformer 30, installed in the above-described switch, includes a core 34 in a ring-shape, a coil 35 winding around the core 34, a rubber coating member 36 tightly covering the coil 35 and the core 34, and a pair of coil terminals 37 connected to the respective ends of the coil 35. The rubber coating member 36 includes a lower coating part 36b for tightly covering the base unit 88 of the main bushing 85 and an upper coating part 36a for covering the jaw unit 87 of the main bushing 85, as well as the coil 35 and the core 34.

As shown in FIG. 4A, in an outer circumferential surface of the lower coating part 36b, an engaging hole 31 is formed at a corresponding level at which the conductive socket 89 of the main bushing 85 is positioned.

Figure 5:
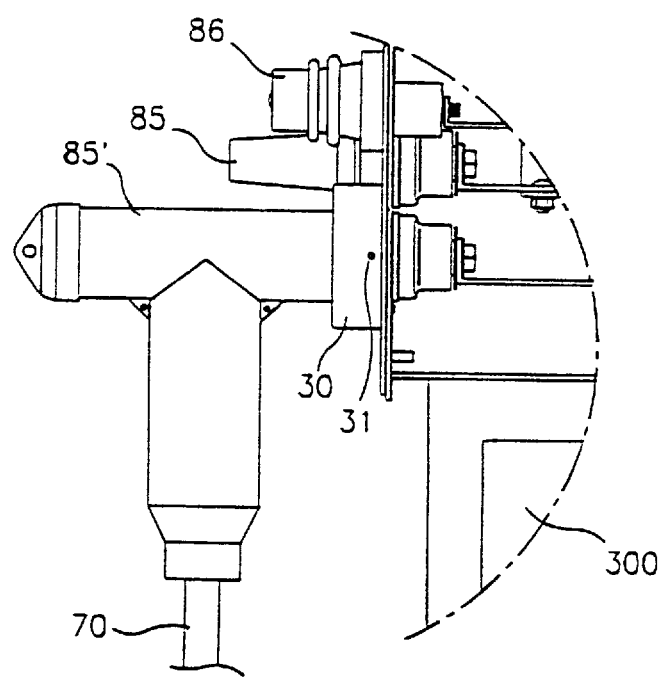
FIG. 5 is a partial detail diagram illustrating the switch connected to the connecting member and the cable connection bushing.

As shown in FIG. 5, the interior shape of the rubber coating member 36 and the position of the engaging hole 31 are formed to be identical with the exterior shape of the base unit 88 and the jaw unit 87 of the main bushing 87 and the position of the conductive socket 89 so that, when the main bushing 85 is inserted into the current transformer 30, the main bushing 85 and the current transformer 30 are engaged tightly.

For the material of the rubber coating member 36, it is desirable to use Ethylene-Propylene-Diene-Terpolymer (EPDM), which is water and heat proof and used for O rings, and, accordingly, the production of a thin current transformer becomes actually possible.

The operation of the current transformer for the load switch according to the present invention will now be described.

When a high voltage from the cable 70 is applied to a conductor 85b, a voltage is induced in the coil 35 proportionate to the current flowing in the cable 70 and the voltage is conducted through the pair of coil terminals 37, whereby a current value can be computed by a current value operation device (not illustrated).

The current value operation device may include an A-D converter for converting an analog voltage signal to a digital signal and an operation device for converting the digital voltage signal from the A-D converter to a memorized current value, corresponding to the digital voltage signal, in a memory means.

And, the induction voltage is outputted to an external device, and electrically connected to the indicator 83.

That is, when a voltage discharged through the engaging hole 31 of the current transformer 30 is over a certain voltage, a condition whether a cable is made conductive or not may be visibly observed through the indicator 83 of a halogen lamp, thereby enabling a person to install, repair, or observe the cable easily.

As described above, the material of the current transformer coating member is made of Ethylene-Propylene-Diene-Terpolymer(EPDM), and accordingly, there is an advantage that the size of the current transformer for the load switch according to the present invention can be made smaller.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A current transformer assembly for detecting the current in an alternating current electrical transmission cable for a load switch having a switching mechanism, comprising:

a bushing including a base unit having a conductive socket electrically connected to a conductive plate for detecting a cable voltage, a jaw unit having a smaller outer diameter than the base unit, and a cone shaped unit extending from the jaw unit and having a smaller outer diameter than the jaw unit; and a current transformer including a ring shaped core, a coil winding the core, a rubber coating member having a lower coating part for tightly covering the base unit of the bushing and an upper coating part for tightly covering the jaw unit of the bushing as well as the coil and the core, and coil terminals connected with respective ends of the coil.

2. The current transformer assembly for a load switch recited by claim 1, wherein an engaging hole, aligned with the conductive socket of the cable connection bushing, is formed in a portion of an outer circumferential surface of the lower coating part of the rubber coating member.

3. The current transformer assembly for a load switch recited by claim 1, wherein the rubber coating member is made of Ethylene-Propylene-Diene-Terpolymer.

4. The current transformer for a load switch of claim 1, wherein interior shapes of the upper coating part and the lower coating part of the rubber coating member are respectively identical with exterior shapes of the base unit and the jaw unit of the cable connection bushing, whereby the current transformer is tightly engaged with the cable connection bushing.

* * * * *